United States Patent
Regalbuto et al.

(10) Patent No.: US 11,851,032 B2
(45) Date of Patent: Dec. 26, 2023

(54) SENSOR ASSEMBLY WITH CLEANING

(71) Applicants: Ford Global Technologies, LLC, Dearborn, MI (US); Valeo North America, Inc., Troy, MI (US)

(72) Inventors: Anthony Michael Regalbuto, Royal Oak, MI (US); Raghuraman Surineedi, Dearborn, MI (US); Kunal Singh, Farmington Hills, MI (US); Venkatesh Krishnan, Canton, MI (US); Rashaun Phinisee, Ypsilanti, MI (US); Michael Whitney, Auburn Hills, MI (US); Jose Alberto Gomez Ramirez, Auburn Hills, MI (US); Benjamin Graham, Auburn Hills, MI (US); Yifu Xiao, Seymour, IN (US)

(73) Assignees: Ford Global Technologies, LLC, Dearborn, MI (US); Valeo North America, Inc., Troy, MI (US)

( * ) Notice: Subject to any disclaimer, the term of this patent is extended or adjusted under 35 U.S.C. 154(b) by 293 days.

(21) Appl. No.: 17/210,620

(22) Filed: Mar. 24, 2021

(65) Prior Publication Data
US 2022/0306048 A1    Sep. 29, 2022

(51) Int. Cl.
| B60S 1/56 | (2006.01) |
| B60S 1/52 | (2006.01) |
| B60S 1/54 | (2006.01) |
| B08B 3/10 | (2006.01) |
| G01S 7/497 | (2006.01) |
| B08B 5/02 | (2006.01) |

(52) U.S. Cl.
CPC ............... B60S 1/56 (2013.01); B08B 3/102 (2013.01); B08B 5/02 (2013.01); B60S 1/52 (2013.01); B60S 1/54 (2013.01); G01S 7/497 (2013.01); G01S 2007/4977 (2013.01)

(58) Field of Classification Search
CPC ...... B60S 1/56; B60S 1/52; B60S 1/54; B08B 3/102; B08B 5/02; B08B 3/02; G01S 7/497; G01S 2007/4977; G02B 27/0006
See application file for complete search history.

(56) References Cited

U.S. PATENT DOCUMENTS

| 9,663,073 | B2 | 5/2017 | Tanaka et al. | |
| 2016/0272163 | A1 | 9/2016 | Dreiocker et al. | |
| 2018/0201232 | A1* | 7/2018 | Ringler | B08B 3/02 |
| 2019/0016306 | A1* | 1/2019 | Krishnan | G05D 1/024 |
| 2019/0086773 | A1* | 3/2019 | Okamura | B60S 1/0848 |
| 2020/0262396 | A1 | 8/2020 | Keller et al. | |
| 2021/0086727 | A1* | 3/2021 | Bopp | H04N 23/52 |
| 2021/0088668 | A1* | 3/2021 | Hahn | B60S 1/54 |

* cited by examiner

Primary Examiner — Erin F Bergner
(74) Attorney, Agent, or Firm — Frank A. MacKenzie; Bejin Bieneman PLC

(57) ABSTRACT

A sensor assembly includes a sensor including a sensor lens, a casing mounted to the sensor, and a fluid nozzle mounted to the casing. The casing at least partially defines a duct positioned to outlet airflow across the sensor lens, and the duct defines a direction of airflow. The fluid nozzle is aimed through the duct in the direction of airflow.

19 Claims, 7 Drawing Sheets

SENSOR ASSEMBLY WITH CLEANING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
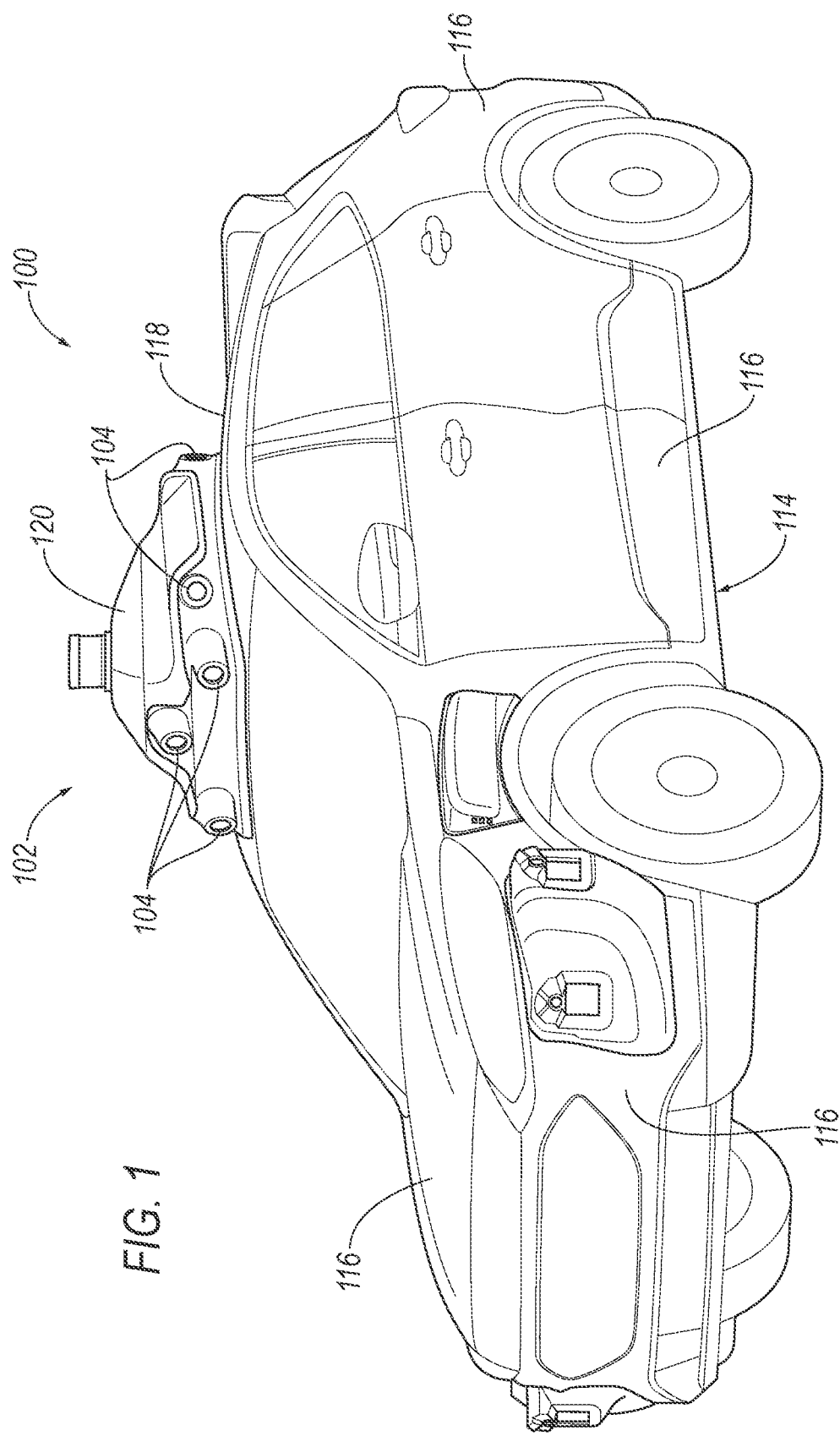
FIG. 1 is a perspective view of an example vehicle.

A sensor assembly includes a sensor including a sensor lens, a casing mounted to the sensor, and a fluid nozzle mounted to the casing. The casing at least partially defines a duct positioned to outlet airflow across the sensor lens, and the duct defines a direction of airflow. The fluid nozzle is aimed through the duct in the direction of airflow.

The sensor assembly may further include a housing including a chamber, and the sensor and the casing may be disposed in the chamber. The housing may partially define the duct. The duct may be shaped to direct airflow from the chamber across the sensor lens.

The casing may include a top panel extending parallel to the sensor lens and two ribs extending from the top panel to the housing, and the ribs may partially define the duct. The ribs may extend parallel to each other.

The fluid nozzle may be mounted to the top panel.

The housing may include a lip extending partially around the sensor lens from one of the ribs away from the duct to the other of the ribs.

The housing may include an aperture, and the sensor lens may define a field of view of the sensor through the aperture. The housing may include a lip extending partially around the aperture, and the lip may block airflow from the chamber through the aperture except through the duct. The duct and the lip may collectively extend fully around the aperture.

The housing may include a housing panel including the aperture, and the housing panel may be shaped to promote laminar flow of air across a transition from the sensor lens to the housing panel on an opposite side of the aperture from the duct.

The sensor assembly may further include a pressure source positioned to raise a pressure in the chamber above an atmospheric pressure. The pressure source may be a blower.

The sensor lens may define an axis, the casing may include an outer surface facing radially outward relative to the axis, and the outer surface may be exposed to the chamber.

The sensor may include a body and a barrel extending from the body to the sensor lens, and the casing may extend from the body to the sensor lens. The casing may be attached to the sensor only at the body. The casing may be attached to the body with a snap fit.

The casing may extend completely around the barrel. The casing may enclose a volume including the barrel, and the casing includes a drain hole open to the volume.

With reference to the Figures, a sensor assembly 102 for a vehicle 100 includes a sensor 104 including a sensor lens 106, a casing 108 mounted to the sensor 104, and a fluid nozzle 110 mounted to the casing 108. The casing 108 at least partially defines a duct 112 positioned to outlet airflow across the sensor lens 106, and the duct 112 defines a direction of airflow. The fluid nozzle 110 is aimed through the duct 112 in the direction of airflow.

The sensor assembly 102 provides cleaning for the sensor 104 in a compact and efficient manner. The design involves a small number of parts, providing low cost and complexity. The sensor assembly 102 shields the fluid nozzle 110 from an exterior environment, which can prevent debris from interfering with the fluid nozzle 110 and can improve aerodynamics.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. A computer can be programmed to operate the vehicle 100 independently of the intervention of a human operator, completely or to a lesser degree. The computer may be programmed to operate the propulsion, brake system, steering system, and/or other vehicle systems based on input from at least the sensors 104. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 100 includes a vehicle body 114. The vehicle 100 may be of a unibody construction, in which a frame and the vehicle body 114 of the vehicle 100 are a single component. The vehicle 100 may, alternatively, be of a body-on-frame construction, in which the frame supports the vehicle body 114 that is a separate component from the frame. The frame and vehicle body 114 may be formed of any suitable material, for example, steel, aluminum, etc. The vehicle body 114 includes body panels 116 partially defining an exterior of the vehicle 100. The body panels 116 may present a class-A surface, e.g., a finished surface exposed to view by a customer and free of unaesthetic blemishes and defects. The body panels 116 include, e.g., a roof 118, etc.

A housing 120 for the sensors 104 is attachable to the vehicle 100, e.g., to one of the body panels 116 of the vehicle 100, e.g., the roof 118. For example, the housing 120 may be shaped to be attachable to the roof 118, e.g., may have a shape matching or following a contour of the roof 118. The housing 120 may be attached to the roof 118, which can provide the sensors 104 with an unobstructed field of view of an area around the vehicle 100. The housing 120 may be formed of, e.g., plastic or metal.

Figure 2:
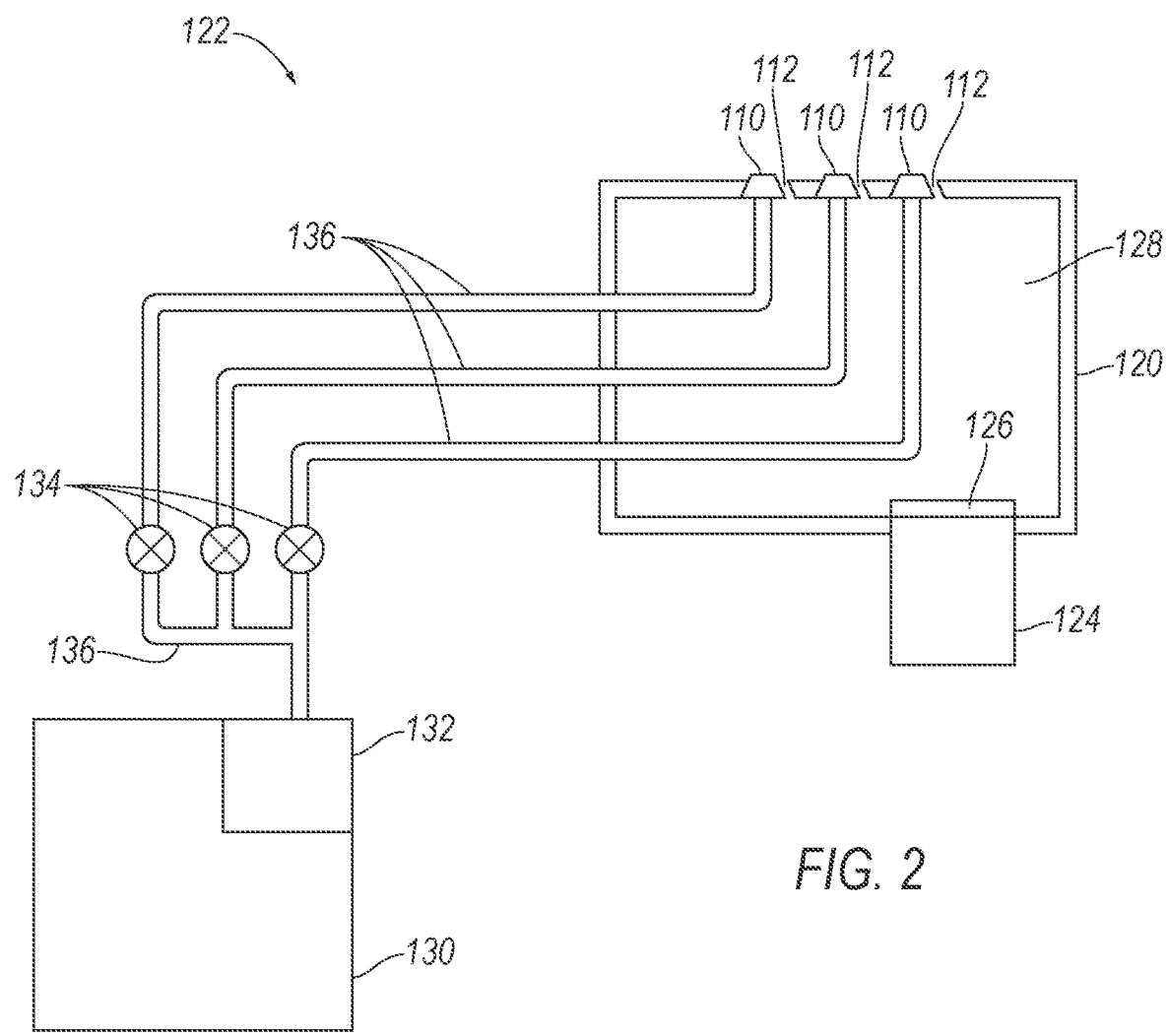
FIG. 2 is a diagram of an example cleaning system of the vehicle.

With reference to FIG. 2, a cleaning system 122 of the vehicle 100 includes a pressure source 124, a filter 126, a chamber 128, and the ducts 112. The pressure source 124 and the ducts 112 are fluidly connected to each other (i.e., fluid can flow from one to the other) through the chamber 128.

The pressure source 124 increases the pressure of a gas occupying the chamber 128. For example, the pressure source 124 may be a blower, which may reduce a volume of the gas or force additional gas into a constant volume. The pressure source 124 may be any suitable type of blower, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type. The pressure source 124 is positioned to raise a pressure of the chamber 128 above an atmospheric pressure. For example, the pressure source 124 is positioned to draw air from an ambient environment outside the housing 120 and to blow the air into the chamber 128.

Alternatively to the pressure source 124 being a blower, the sensor assembly 102 may pressurize the chamber 128 of the housing 120 in other ways. For example, forward motion of the vehicle 100 may force air through passageways leading to the chamber 128.

The filter 126 removes solid particulates such as dust, pollen, mold, dust, and bacteria from air flowing through the filter 126. The filter 126 may be any suitable type of filter, e.g., paper, foam, cotton, stainless steel, oil bath, etc.

The housing 120 includes the chamber 128. The housing 120 may fully or partially enclose and form the chamber 128. The sensors 104 are disposed in the chamber 128. The chamber 128 is arranged to permit air to enter from the pressure source 124. Air can exit the chamber 128 through the ducts 112. The chamber 128 may be sealed other than the pressure source 124 and the ducts 112.

The ducts 112 are arranged to outlet airflow from the chamber 128. Air in the chamber 128 is above atmospheric pressure, and air outside the housing 120, i.e., in the ambient environment, is at atmospheric pressure. The pressure difference causes air to exit from the chamber 128 through the ducts 112. As described in more detail below, the ducts 112 are formed of the housing 120 and of the respective casings 108, and the ducts 112 outlet airflow across the respective sensor lenses 106.

The cleaning system 122 of the vehicle 100 further includes a reservoir 130, a pump 132, valves 134, supply lines 136, and the fluid nozzles 110. The reservoir 130, the pump 132, and the fluid nozzles 110 are fluidly connected to each other (i.e., fluid can flow from one to the other). The cleaning system 122 distributes washer fluid stored in the reservoir 130 to the fluid nozzles 110. "Washer fluid" is any liquid stored in the reservoir 130 for cleaning. The washer fluid may include solvents, detergents, diluents such as water, etc.

The reservoir 130 may be a tank fillable with liquid, e.g., washer fluid for window cleaning. The reservoir 130 may be disposed in the housing 120, or, alternatively, the reservoir 130 may be disposed in a front of the vehicle 100, specifically, in an engine compartment forward of a passenger cabin. The reservoir 130 may store the washer fluid only for supplying the sensor assembly 102 or also for other purposes, such as supply to the windshield.

The pump 132 may force the washer fluid through the supply lines 136 to the liquid nozzles with sufficient pressure that the washer fluid sprays from the fluid nozzles 110. The pump 132 is fluidly connected to the reservoir 130. The pump 132 may be attached to or disposed in the reservoir 130.

Each valve 134 is positioned and operable to control fluid flow from the pump 132 to one of the fluid nozzles 110. Specifically, fluid from the supply line 136 from the pump 132 must flow through one of the valves 134 to reach the respective supply line 136 providing fluid to the respective fluid nozzle 110. The valves 134 control flow by being actuatable between an open position permitting flow and a closed position blocking flow from the incoming to the outgoing of the supply lines 136. The valves 134 can be solenoid valves. As a solenoid valve, each valve 134 includes a solenoid and a plunger. Electrical current through the solenoid generates a magnetic field, and the plunger moves in response to changes in the magnetic field. The solenoid moves the plunger between a position in which the valve 134 is open and a position in which the valve 134 is closed.

The supply lines 136 extend from the pump 132 to the fluid nozzles 110. The supply lines 136 may be, e.g., flexible tubes.

The fluid nozzles 110 receive fluid from the respective supply lines 136. The fluid nozzles 110 are positioned to discharge fluid onto the respective sensor lenses 106, as described in more detail below.

Figure 3:
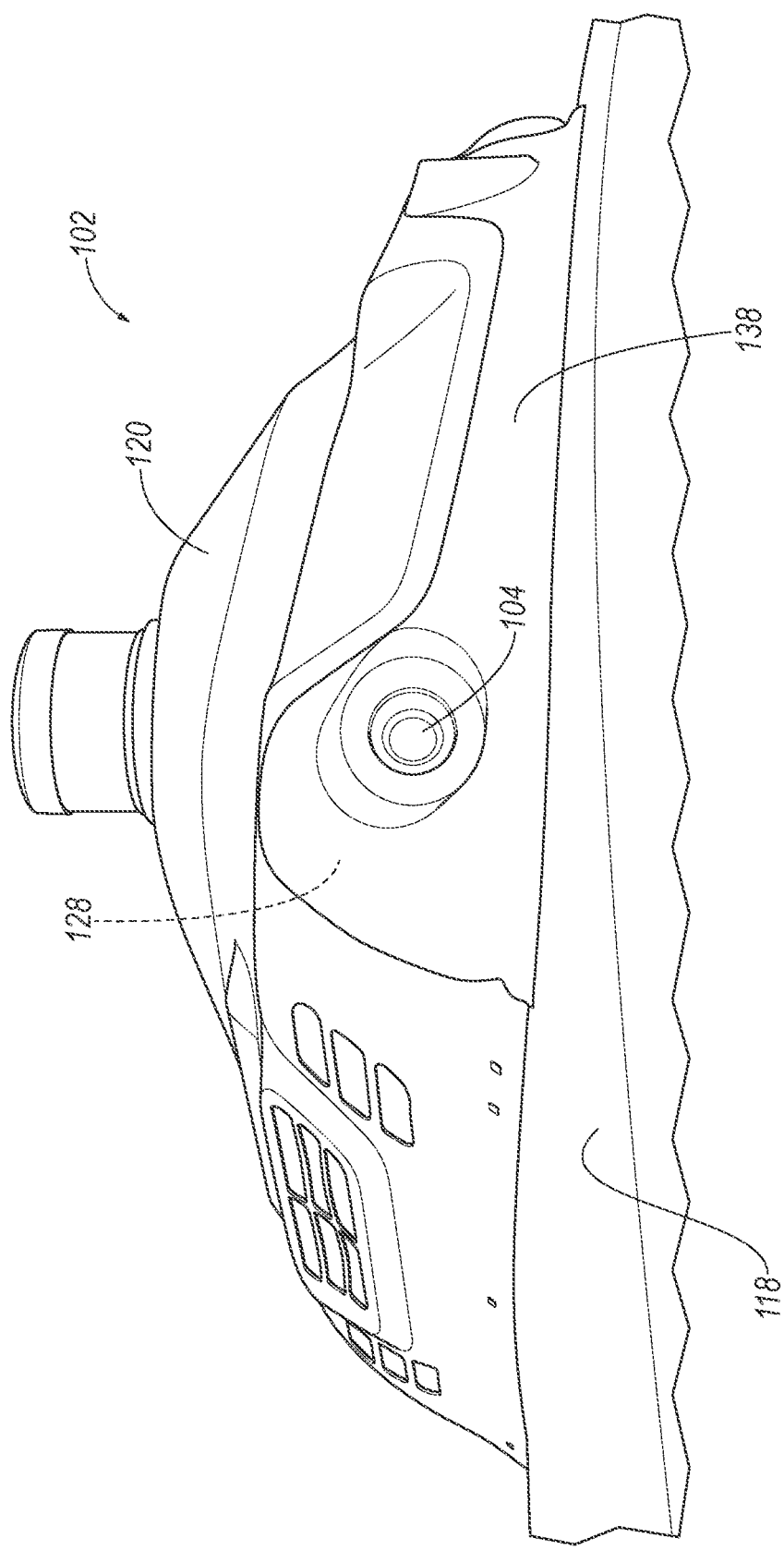
FIG. 3 is a rear perspective view of an example sensor assembly on the vehicle.

With reference to FIG. 3, the housing 120 includes one or more housing panels 138 partially forming the chamber 128. The housing panels 138 form an exterior of the housing 120 and are exposed to the ambient environment.

Figure 4:
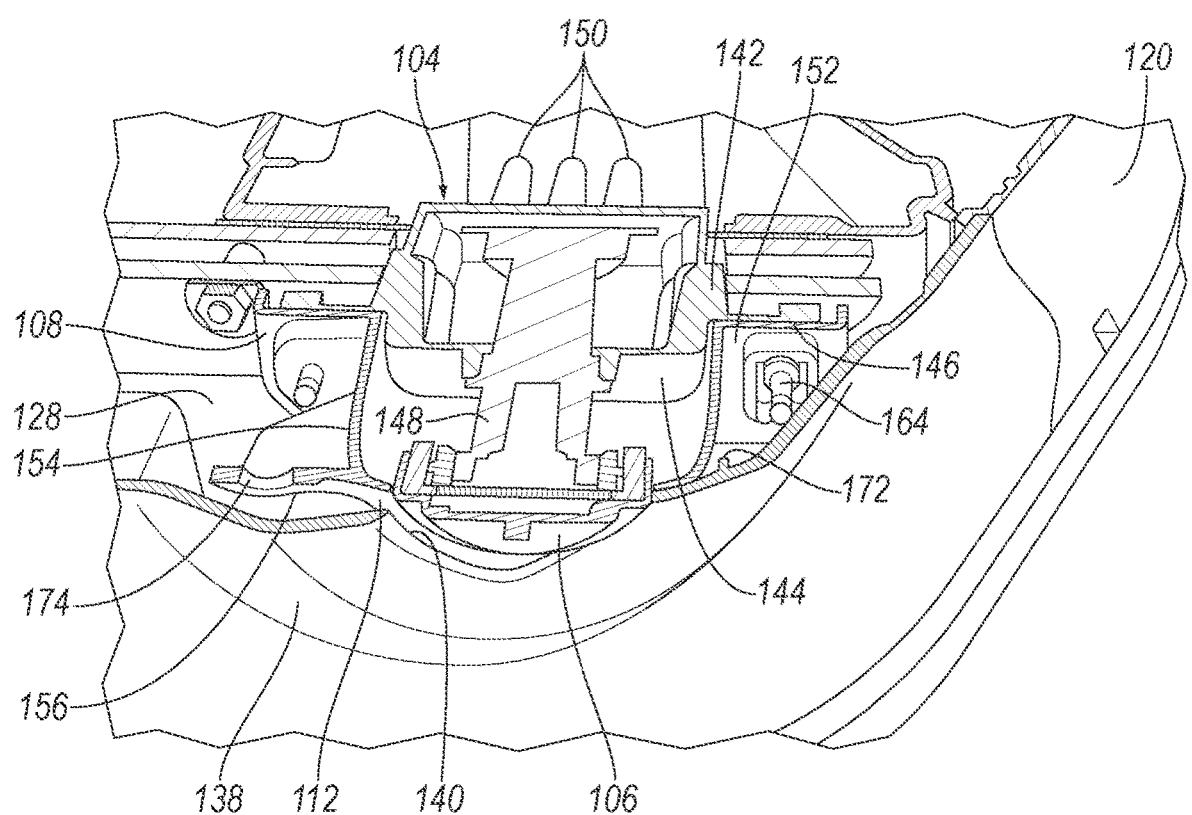
FIG. 4 is a perspective cross-sectional view of an example sensor in a housing of the sensor assembly.
Figure 5:
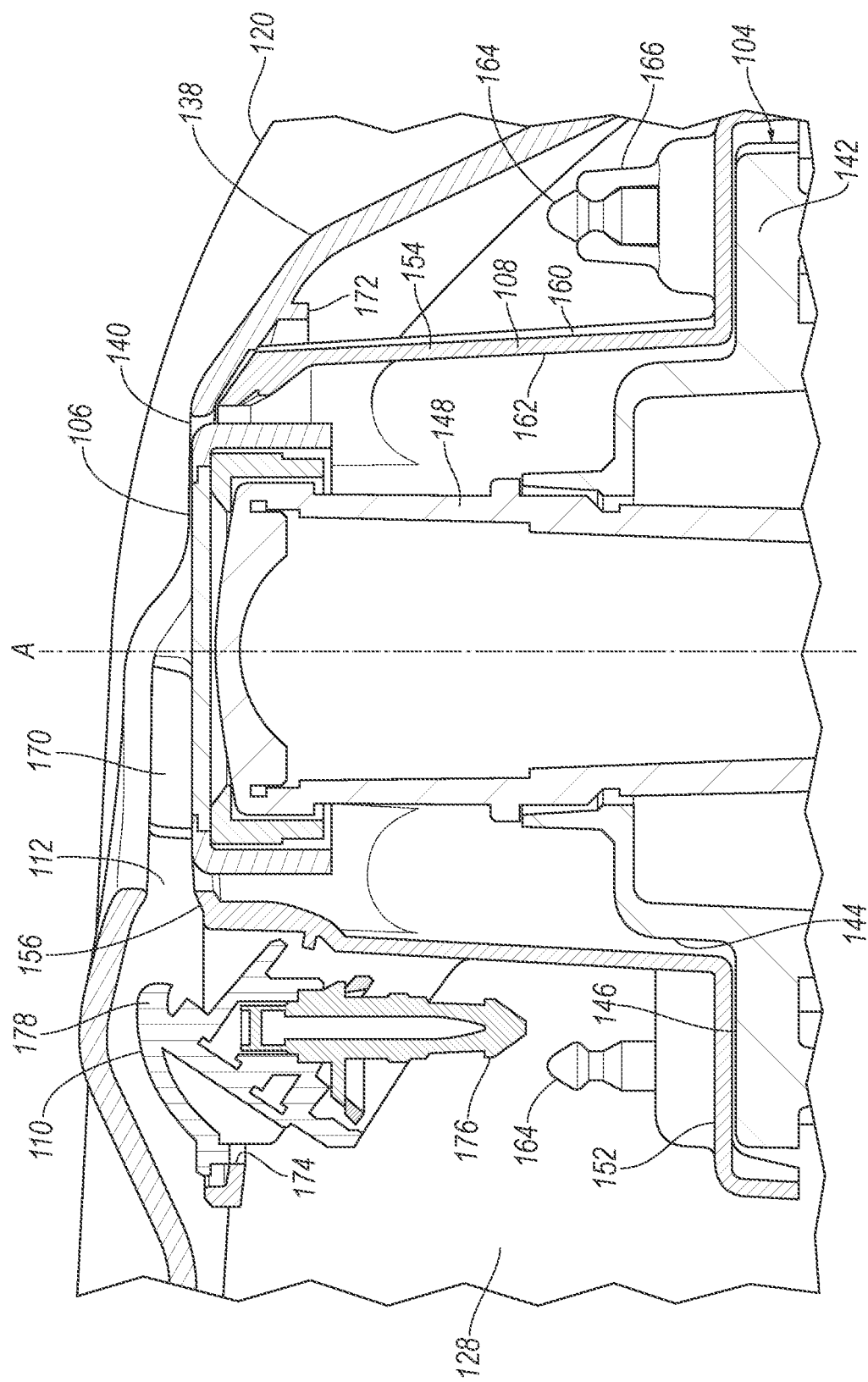
FIG. 5 is a top cross-sectional view of the sensor in the housing.

The housing 120 includes apertures 140. The apertures 140 are holes in the housing 120 leading from the chamber 128 to the ambient environment. The apertures 140 are through the housing panels 138. The apertures 140 are circular in shape. The housing 120 includes one aperture 140 for each of the sensors 104. Each sensor 104 has a field of view received through the respective aperture 140. The sensors 104 may extend into the respective apertures 140, as seen in FIGS. 4 and 5. For example, the aperture 140 may be concentric about a portion of the sensor 104, e.g., the sensor lens 106.

With reference to FIGS. 4 and 5, the sensors 104 disposed in the housing 120, specifically in the chamber 128. The sensors 104 may be arranged to collectively cover a 360° field of view with respect to a horizontal plane, as best seen in FIG. 1. The sensors 104 are fixed inside the chamber 128. The sensors 104 are fixedly attached directly or indirectly to the housing 120. Each sensor 104 has a field of view through the respective sensor lens 106 and the respective aperture 140, and the field of view of one of the sensors 104 may overlap the fields of view of the sensors 104 that are circumferentially adjacent to one another, i.e., that are immediately next to each other.

The sensors 104 include the respective sensor lenses 106. The sensor lenses 106 may be convex. Each sensor lens 106 may define the field of view of the respective sensor 104 through the aperture 140. Each sensor lens 106 defines an axis A (shown in FIG. 5), around which the sensor lens 106 is radially symmetric. The axis A extends along a center of the field of view of the respective sensor 104.

The sensors 104 detect the external world, e.g., objects and/or characteristics of surroundings of the vehicle 100, such as other vehicles, road lane markings, traffic lights and/or signs, pedestrians, etc. For example, the sensors 104 may be radar sensors, scanning laser range finders, light detection and ranging (LIDAR) devices, or image processing sensors such as cameras. In particular, the sensors 104 can be cameras. As cameras, the sensors 104 can detect electromagnetic radiation in some range of wavelengths. For example, the sensors 104 may detect visible light, infrared radiation, ultraviolet light, or some range of wavelengths including visible, infrared, and/or ultraviolet light. For another example, the sensors 104 may be time-of-flight (TOF) cameras, which include a modulated light source for illuminating the environment and detect both reflected light from the modulated light source and ambient light to sense reflectivity amplitudes and distances to the scene.

Each sensor 104 includes a body 142. The body 142 contains components for turning light focused by the sensor lens 106 into a digital representation of the image, e.g., a mosaic filter, image sensor, analog-digital converter, etc. (not shown). The sensor 104 is mounted to the housing 120 via the body 142. The body 142 includes an outer surface 144 facing outward, i.e., away from the components contained in the body 142. The outer surface 144 includes a front face 146 to which the casing 108 is mounted. The front face 146 faces toward the respective aperture 140.

Each sensor 104 includes a barrel 148. The barrel 148 extends from the front face 146 of the body 142. The barrel 148 is cylindrical. The barrel 148 may be a single piece with the body 142 or may be a separate component fixed to the body 142. The barrel 148 defines the axis A. The axis A can be perpendicular to a plane defined by the front face 146. The sensor lens 106 is disposed at an end of the barrel 148 farthest from the body 142. The sensor lens 106 is thus spaced from the body 142. The barrel 148 is elongated along the axis A from the body 142 to the sensor lens 106. Light is focused by the sensor lens 106 through the barrel 148 to the components inside the body 142.

Focusing on FIG. 4, each sensor 104 includes a plurality of fins 150. The fins 150 extend from the body 142 in an opposite direction as the barrel 148 extends from the body 142. The fins 150 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 150 may be aluminum. The fins 150 are shaped to have a high ratio of surface area to volume, e.g., long, thin poles or plates.

Figure 6:
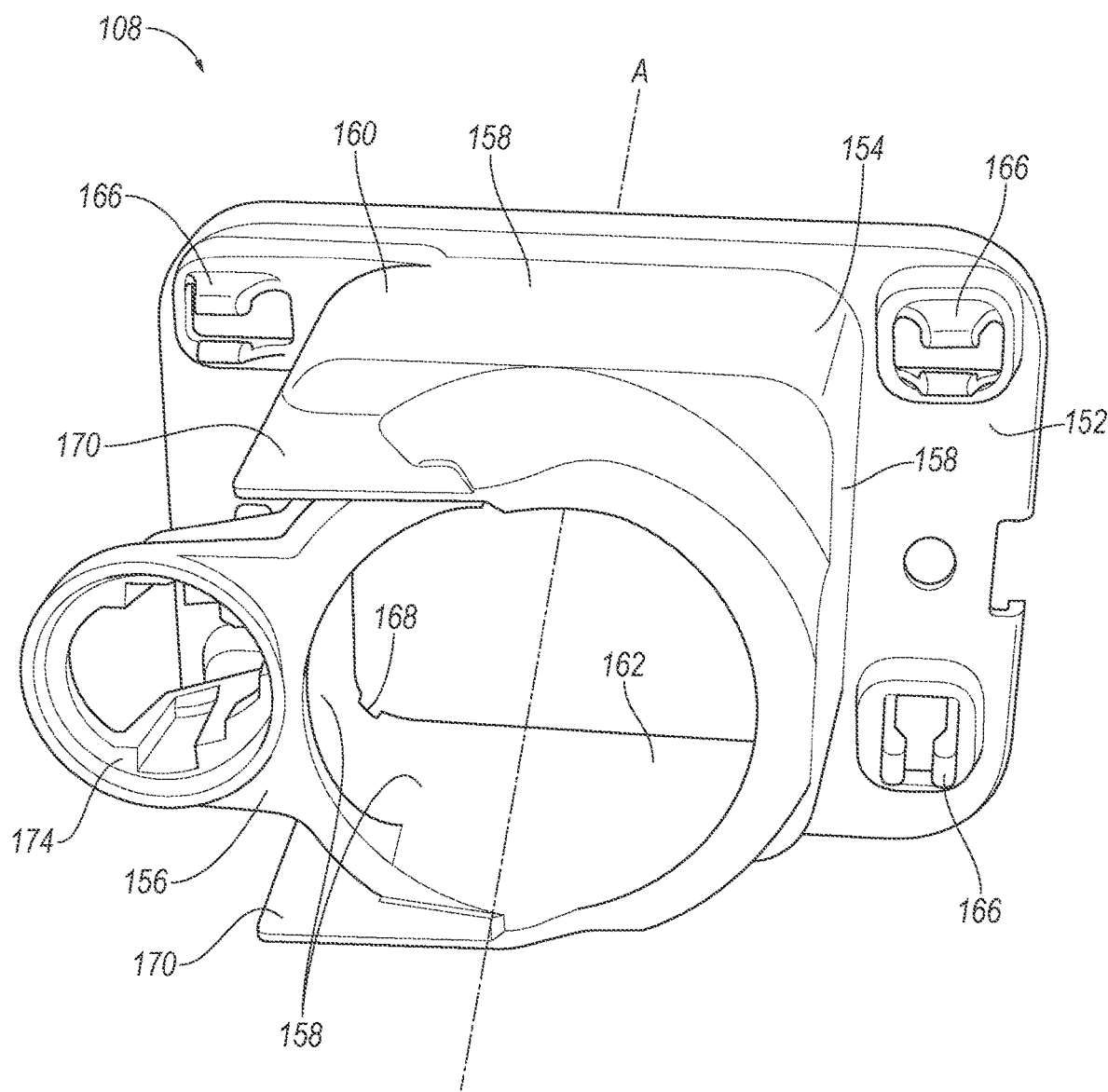
FIG. 6 is a perspective view of a casing of the sensor assembly.

With reference to FIG. 6, each casing 108 includes a base portion 152, a tunnel portion 154, and a top panel 156. The tunnel portion 154 extends circumferentially around the axis A. For example, the tunnel portion 154 can include a plurality of flat panels 158, e.g., four flat panels 158, connected together in a circumferential loop around the axis A. The casing 108 includes an outer surface 160 facing radially outward relative to the axis A and an inner surface 162 facing radially inward relative to the axis A. For example, the outer surface 160 can include surfaces of the flat panels 158 that face away from the axis A, and the inner surface 162 can include surfaces of the flat panels 158 that face toward the axis A. The top panel 156 extends parallel to the sensor lens 106 (shown in FIG. 5), i.e., orthogonal to the axis A defined by the sensor lens 106. The base portion 152 extends radially outward from the tunnel portion 154 relative to the axis A, and the top panel 156 extends radially inward from the tunnel relative to the axis A. The top panel 156 and the base portion 152 can be parallel to each other.

Returning to FIGS. 4 and 5, the casing 108 is mounted to the body 142 of the sensor 104. Specifically, the casing 108 is directly attached to the body 142, e.g., the front face 146 of the body 142. Specifically, the base portion 152 can extend parallel to the front face 146 and abut the front face 146. The casing 108 can be attached to the body 142 with a snap fit. For example, the body 142 can include a plurality of male clips 164, and the base portion 152 can include a plurality of corresponding female clips 166 engageable with the male clips 164 (or vice versa). The snap fit provides for an easy assembly and disassembly.

The casing 108 is disposed in the chamber 128. The casing 108 extends from the body 142 to the sensor lens 106. The casing 108 extends completely around the barrel 148 and the sensor lens 106. The outer surface 160 is exposed to the chamber 128. For the purposes of this disclosure, "A is exposed to B" means that a surface A is disposed within a volume defined and enclosed by a structure B without intermediate components shielding the surface A from the structure B. The casing 108 encloses a volume including the barrel 148. The volume is defined by the inner surface 162 of the casing 108, the top panel 156 of the casing 108, and the front face 146 of the body 142 of the sensor 104. The casing 108 shields the barrel 148 from the chamber 128.

The casing 108 is attached to the sensor 104 only at the body 142. The base portion 152 of the casing 108 is attached to the body 142 of the sensor 104, and the rest of the casing 108 is not attached to the sensor 104. The tunnel portion 154 and the top panel 156 hang from the base portion 152 and extend around the barrel 148 and sensor lens 106 without being attached directly to the barrel 148 or sensor lens 106. This arrangement reduces vibrations experienced by the sensor 104.

With reference to FIG. 6, the casing 108 includes a drain hole 168. The drain hole 168 extends through the tunnel portion 154, i.e., from the volume to outside the tunnel portion 154, i.e., to the chamber 128. The drain hole 168 is open to the volume and open to the chamber 128. The drain hole 168 may be located where the tunnel portion 154 meets the base portion 152, and the drain hole 168 may be spaced from the top panel 156. The drain hole 168 is circumferentially located at a lowest point of the tunnel portion 154. For example, the drain hole 168 can be located at a corner between two of the flat panels 158 of the tunnel portion 154. This location means that the drain hole 168 is at a lowest point when the casing 108 is in positions rotated 90° from each other around the axis A, meaning that the same design for the casing 108 can be used in multiple orientations. Gravity tends to pull moisture that enters the volume downward toward the drain hole 168.

The casing 108 includes two ribs 170. The ribs 170 extend from the top panel 156 of the casing 108 to the housing panel 138, as shown in FIG. 5. The ribs 170 can abut the housing panel 138 or can come sufficiently close to the housing panel 138 that effectively no airflow passes through a gap between the housing panel 138 and an edge of the rib 170 closest to the housing panel 138. The ribs 170 have flat surfaces facing toward each other, and the ribs 170 extend parallel to each other. A distance between the ribs 170 can be approximately equal to a diameter of the barrel 148 at the sensor lens 106, thus guiding airflow across an entirety of the sensor lens 106 while keeping the duct 112 compact.

Figure 7:
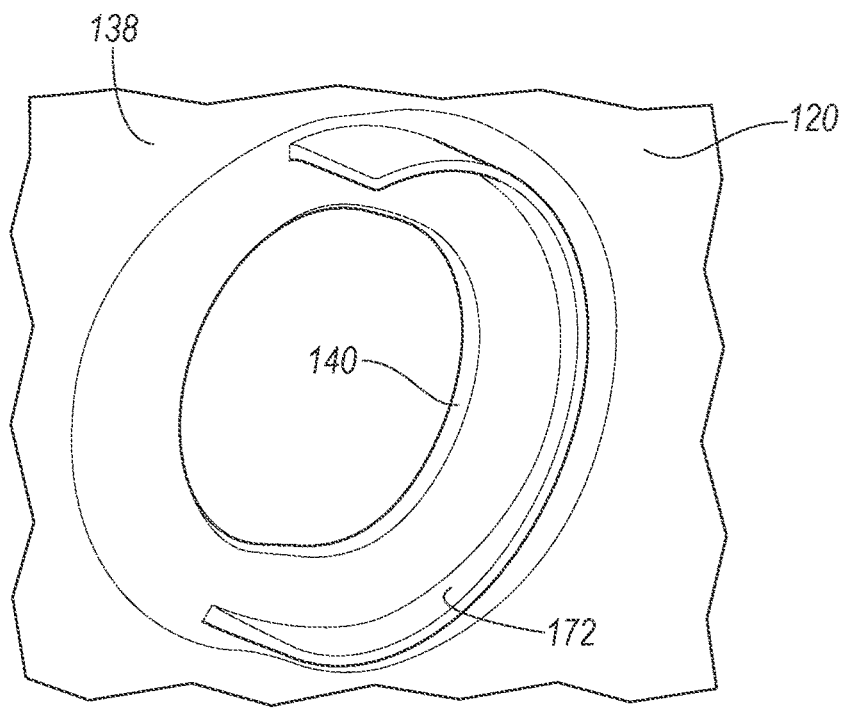
FIG. 7 is a perspective view of a portion of an inside of the housing.

With reference to FIG. 7, for each aperture 140, the housing 120 includes a lip 172 extending partially around the aperture 140. The lip 172 can have a constant radius from the axis A. The lip 172 can extend at least 180° around the axis A. When the casing 108 is installed, as seen in FIGS. 4 and 5, the lip 172 extends partially around the sensor lens 106 from one of the ribs 170 away from the duct 112 (i.e., away from the space directly between the ribs 170) to the other of the ribs 170. The lip 172 can help locate the casing 108 during assembly of the sensor assembly 102.

Figure 8:
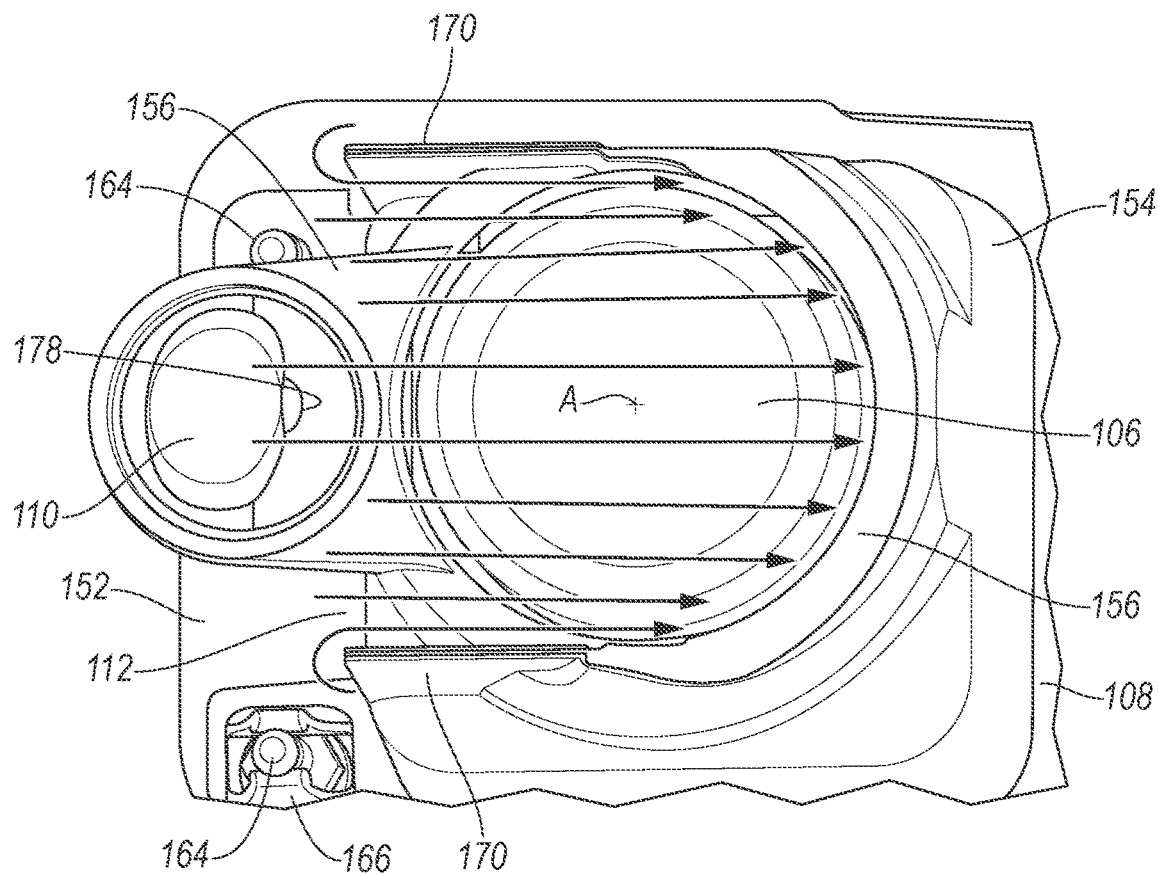
FIG. 8 is a plan view of a portion of the sensor assembly with the housing removed for illustration.

With reference to FIG. 8, the casing 108 at least partially defines the duct 112. Specifically, the ribs 170 and the top panel 156 partially define the duct 112. As seen in FIGS. 4 and 5, the housing 120 partially defines the duct 112. In other words, the duct 112 is formed of the housing 120 and the casing 108. The duct 112 is circumscribed by, in order, the top panel 156, one of the ribs 170, the housing 120, and the other of the ribs 170. The ribs 170 are parallel to each other. The portions of the housing 120 and the top panel 156 forming the duct 112 are parallel to each other, as best seen in FIG. 4.

The pressure in the chamber 128 is higher than the pressure outside the housing 120, which causes air to exit the chamber 128 through the duct 112. The duct 112 defines a direction of airflow. The direction is toward the axis A and toward the sensor lens 106. The duct 112 is shaped to direct airflow from the chamber 128 across the sensor lens 106. The duct 112 is positioned to outlet airflow across the sensor lens 106. The parallel arrangements of the ribs 170 and of the housing 120 and the top panel 156 helps make the airflow straight and laminar. Laminar flow clears debris from the sensor lens 106 better than turbulent flow. The duct 112 and the lip 172 collectively extend fully around the aperture 140. The lip 172 blocks airflow from the chamber 128 through the aperture 140 except through the duct 112.

Returning to FIGS. 4 and 5, the housing panel 138 is shaped to promote laminar flow of air across a transition from the sensor lens 106 to the housing panel 138 on an opposite side of the aperture 140 from the duct 112, i.e., the portion of the housing panel 138 at which the duct 112 is aimed. The housing panel 138 at the aperture 140 opposite the duct 112 is sufficiently close to tangent with the sensor lens 106 that laminar flow of air occurs from the sensor lens 106 to the housing panel 138, rather than turbulence being caused by the transition from the sensor lens 106 to the housing panel 138.

With reference to FIG. 5, the fluid nozzle 110 is mounted to the casing 108, specifically to the top panel 156. The fluid nozzle 110 extends through the top panel 156. For example, the top panel 156 includes an overhanging portion extending radially outside the tunnel portion 154 that includes a mounting slot 174 extending therethrough, as shown in FIG. 6. The fluid nozzle 110 can snap into the mounting slot 174. The fluid nozzle 110 can be centered between the two ribs 170. The fluid nozzle 110 includes an inlet 176 extending below the top panel 156, i.e., away from the duct 112, to which one of the supply lines 136 connects. The fluid nozzle 110 includes an outlet 178 extending into the duct 112. A fluid path extends through the fluid nozzle 110 from the inlet 176 to the outlet 178.

The fluid nozzle 110 is aimed through the duct 112 in the direction of airflow. Specifically, the fluid nozzle 110 is aimed across and at the sensor lens 106 so that the fluid strikes the sensor lens 106 at a shallow angle, e.g., less than 10°. The location of the fluid nozzle 110 in the duct 112 and the directions of airflow and fluid spray being the same help minimize interference between the airflow and the fluid. The fluid nozzle 110 and the duct 112 can thus be active at the same time. For example, the pressure source 124 can operate constantly, with the duct 112 providing an air curtain across the sensor lens 106, and the pump 132 or valve 134 can be actuated as needed for cleaning the sensor lens 106.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
a housing including a chamber;
a sensor including a sensor lens and being disposed in the chamber;
a casing mounted to the sensor and being disposed in the chamber, the casing at least partially defining a duct positioned to outlet airflow from the chamber across the sensor lens, the duct defining a direction of airflow;
a fluid nozzle mounted to the casing and aimed through the duct in the direction of airflow; and
a pressure source positioned to raise a pressure in the chamber above an atmospheric pressure.

2. The sensor assembly of claim 1, wherein the housing partially defines the duct.

3. The sensor assembly of claim 2, wherein the duct is shaped to direct airflow from the chamber across the sensor lens.

4. The sensor assembly of claim 2, wherein the casing includes a top panel extending parallel to the sensor lens and two ribs extending from the top panel to the housing, and the ribs partially define the duct.

5. The sensor assembly of claim 4, wherein the ribs extend parallel to each other.

6. The sensor assembly of claim 4, wherein the fluid nozzle is mounted to the top panel.

7. The sensor assembly of claim 4, wherein the housing includes a lip extending partially around the sensor lens from one of the ribs away from the duct to the other of the ribs.

8. The sensor assembly of claim 1, wherein the housing includes an aperture, and the sensor lens defines a field of view of the sensor through the aperture.

9. The sensor assembly of claim 8, wherein the housing includes a lip extending partially around the aperture, and the lip blocks airflow from the chamber through the aperture except through the duct.

10. The sensor assembly of claim 9, wherein the duct and the lip collectively extend fully around the aperture.

11. The sensor assembly of claim 8, wherein the housing includes a housing panel including the aperture, and the housing panel is shaped to promote laminar flow of air across a transition from the sensor lens to the housing panel on an opposite side of the aperture from the duct.

12. The sensor assembly of claim 1, wherein the pressure source is a blower.

13. The sensor assembly of claim 1, wherein the sensor lens defines an axis, the casing includes an outer surface facing radially outward relative to the axis, and the outer surface is exposed to the chamber.

14. The sensor assembly of claim 1, wherein the sensor includes a body and a barrel extending from the body to the sensor lens, and the casing extends from the body to the sensor lens.

15. The sensor assembly of claim 14, wherein the casing is attached to the sensor only at the body.

16. The sensor assembly of claim 15, wherein the casing is attached to the body with a snap fit.

17. The sensor assembly of claim 14, wherein the casing extends completely around the barrel.

18. The sensor assembly of claim 17, wherein the casing encloses a volume including the barrel, and the casing includes a drain hole open to the volume.

19. The sensor assembly of claim 1, wherein the housing includes an aperture through which the sensor has a field of view, the sensor includes a body and a barrel extending from the body to the sensor lens, and the casing extends from the body to the aperture.

* * * * *